US012483834B2

(12) United States Patent
Mori et al.

(10) Patent No.: US 12,483,834 B2
(45) Date of Patent: Nov. 25, 2025

(54) INFORMATION PROCESSING APPARATUS AND CONTROL METHOD

(71) Applicant: Lenovo (Singapore) Pte. Ltd., Singapore (SG)

(72) Inventors: Hidehisa Mori, Kanagawa (JP); Dadao Tian, Kanagawa (JP); Hironari Nishino, Kanagawa (JP); Qian Wang, Kanagawa (JP); Chikara Takahashi, Kanagawa (JP); Tabito Miyamoto, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 173 days.

(21) Appl. No.: 18/390,899

(22) Filed: Dec. 20, 2023

(65) Prior Publication Data

US 2024/0251204 A1 Jul. 25, 2024

(30) Foreign Application Priority Data

Jan. 23, 2023 (JP) ................................ 2023-008184

(51) Int. Cl.
*H04R 5/04* (2006.01)
*H04S 7/00* (2006.01)

(52) U.S. Cl.
CPC ............... *H04R 5/04* (2013.01); *H04S 7/301* (2013.01); *H04S 2400/15* (2013.01)

(58) Field of Classification Search
CPC ........... H04R 3/00; H04R 5/04; G06F 1/1684; G06F 1/1688; G06F 3/16; H04S 7/301; H04S 2400/15
USPC .......................................................... 381/58
See application file for complete search history.

(56) References Cited

U.S. PATENT DOCUMENTS

2006/0262940 A1* 11/2006 Asada .................. H04R 29/001 381/58

FOREIGN PATENT DOCUMENTS

| | | | |
|---|---|---|---|
| JP | S49-106315 | A | 10/1974 |
| JP | 2006-303769 | A | 11/2006 |
| JP | 2022-515648 | A | 2/2022 |
| WO | 2020/139838 | A1 | 7/2020 |

* cited by examiner

*Primary Examiner* — Paul Kim
(74) *Attorney, Agent, or Firm* — Osha Bergman Watanabe & Burton LLP

(57) ABSTRACT

An information processing apparatus includes: two amplifiers that and output sound signals based on sound data to two speakers, respectively, that the stereo speaker has; a connector that connects the amplifiers to the two speakers; and a microphone. When a first stereo speaker is to be connected to the connector, the stereo speaker is connected so that the two speakers of the first stereo speaker are in phase with each other. When a second stereo speaker is to be connected to the connector, the stereo speaker is connected so that the two speakers of the second stereo speaker are in reverse phase with each other. The information processing apparatus outputs a sound signal based on predetermined sound data from the amplifiers to the stereo speaker, thus identifying the type of the stereo speaker connected to the connector based on the sound collected with the microphone.

7 Claims, 7 Drawing Sheets

INFORMATION PROCESSING APPARATUS AND CONTROL METHOD

CROSS-REFERENCE TO RELATED APPLICATIONS

This application claims priority to Japanese Patent Application No. 2023-008184 filed on Jan. 23, 2023, the contents of which are hereby incorporated herein by reference in their entirety.

BACKGROUND

Technical Field

The present invention relates to an information processing apparatus and a control method.

Description of Related Art

Information processing apparatuses equipped with a speaker are available. For instance, laptop personal computers (PCs) typically have a built-in stereo speaker. A general-purpose PC may be designed to accommodate speakers from two suppliers, for example, to ensure a stable supply of components for the mass production.

Different types of speakers have some parameters with different characteristics from each other. To get the performance of the speaker no matter which of the two suppliers' speakers is connected, parameter information for each supplier's speaker is required. For instance, Japanese Unexamined Patent Application Publication (Translation of PCT Application) No. 2022-515648 describes a Thiele-small (TS) parameter that is a parameter related to speaker characteristics.

One way to identify the type of speaker connected is providing an identification terminal on the connector to which the speaker is connected. For instance, two terminals for identification may be provided: for a first speaker, the two terminals are not connected (open); and for a second speaker, the two terminals are connected (close). This configuration enables identification about which speaker is connected. However, in the case of a stereo speaker, for example, four terminals will be provided for connecting two speakers as a pair, and if the two terminals for identification are further added, a connector with six terminals will be required. An increase in the number of connector terminals impacts the cost and space on a circuit board (e.g., a motherboard).

SUMMARY

In view of the above, the present invention aims to provide an information processing apparatus and a control method that allow for the connection of two types of stereo speakers while suppressing the impact on cost and space on a circuit board.

To solve the above problems, an information processing apparatus according to the first aspect of the present invention is to be connected to one of two types of connectable stereo speakers, and includes: a memory that stores sound data for sound to be output from the stereo speakers; two amplifiers that output sound signals based on the sound data to two speakers, respectively, that each stereo speaker has; a connector that connects the two audio amplifiers to the two speakers; a microphone capable of collecting at least the sound output from the stereo speakers; and a processor that controls output to the stereo speakers. When a first stereo speaker of the two types of stereo speakers is to be connected to the connector, the first stereo speaker is connected to the amplifiers via the connector so that the two speakers of the first stereo speaker are in phase with each other, when a second stereo speaker of the two types of stereo speakers is to be connected to the connector, the second stereo speaker is connected to the amplifiers via the connector so that the two speakers of the second stereo speaker are in reverse phase with each other, the processor outputs a sound signal based on predetermined sound data from the amplifiers to the stereo speaker connected to the connector, thus collecting sound output from the stereo speaker with the microphone, and performing identification process of identifying the type of the stereo speaker connected to the connector based on the collected sound.

In the information processing apparatus as stated above, the processor may identify the type of the stereo speaker based on sound pressure of the sound collected with the microphone in the identification process.

In the information processing apparatus as stated above, based on the type of the stereo speaker identified in the identification process, when the first stereo speaker is connected to the connector, the processor may control so that sound signals output from the two amplifiers are in phase with each other, and when the second stereo speaker is connected to the connector, may control so that sound signals output from the two amplifiers are in reverse phase with each other.

In the information processing apparatus as stated above, the memory may store a parameter in accordance with characteristics of each of the two types of stereo speakers, the information processing apparatus may further include an audio processing unit that uses the parameter when generating a sound signal to be output to the stereo speakers from the sound data, and based on the type of the stereo speaker identified in the identification process, the processor may read the parameter for the stereo speaker connected to the connector from the memory so that the parameter is usable at the audio processing unit.

In the information processing apparatus as stated above, a sound signal based on the predetermined sound data may include a sine-wave signal.

In the information processing apparatus as stated above, the processor may perform the identification process at a step before shipment from a factory or when a component of the stereo speakers is replaced after the shipment.

A control method according to the second aspect of the present invention is for an information processing apparatus that is connected to one of two types of connectable stereo speakers, and the information processing apparatus includes: a memory that stores sound data of sound to be output from the stereo speakers; two amplifiers as a pair that output sound signals based on the sound data to two speakers as a pair, respectively, that each stereo speaker has; a connector that connects the two audio amplifiers as a pair to the two speakers as a pair; a microphone capable of collecting at least the sound output from the stereo speakers; and a processor that controls output to the stereo speakers. When a first stereo speaker of the two types of stereo speakers is to be connected to the connector, the first stereo speaker is connected to the amplifiers via the connector so that the two speakers as a pair of the first stereo speaker are in phase with each other, and when a second stereo speaker of the two types of stereo speakers is to be connected to the connector, the second stereo speaker is connected to the amplifiers via the connector so that the two speakers as a pair of the second stereo speaker are in reverse phase with each other. The processor performing: outputting a sound signal based on predetermined sound data from the amplifiers to the stereo speaker connected to the connector; collecting sound output from the stereo speaker with the microphone; and identifying the type of the stereo speaker connected to the connector based on the sound collected with the microphone.

The above-described aspects of the present invention support the connection with two types of stereo speakers while reducing the impact on cost and space on the circuit board.

DETAILED DESCRIPTION

The following describes one embodiment of the present invention, with reference to the attached drawings.

Figure 1:
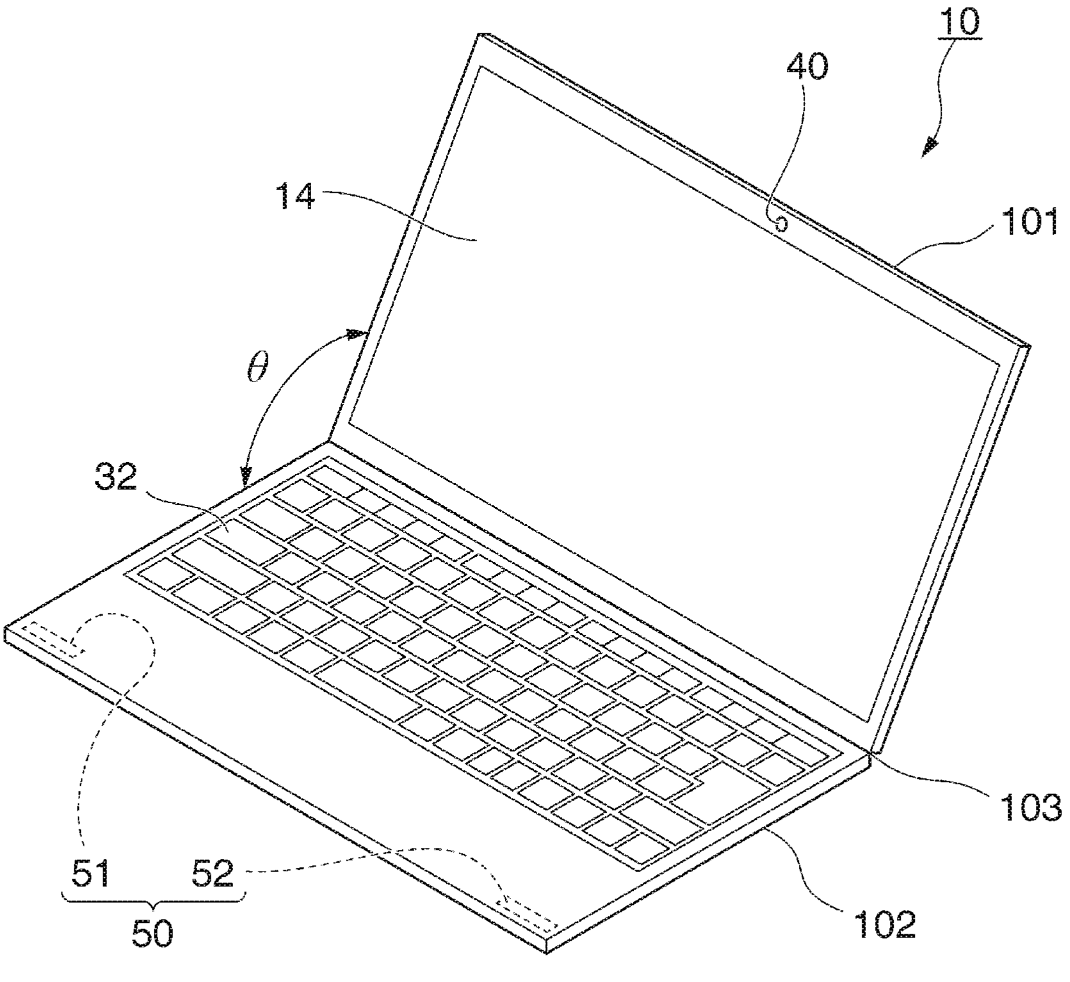
FIG. 1 is a perspective view illustrating the appearance of an information processing apparatus according to one embodiment.

FIG. 1 is a perspective view illustrating the appearance of an information processing apparatus according to the present embodiment. The illustrated information processing apparatus 10 is a clamshell-type laptop PC. The information processing apparatus 10 includes a first chassis 101, a second chassis 102 and a hinge mechanism 103. The first chassis 101 and second chassis 102 have a substantially rectangular plate-shape (e.g., flat plate-shape). One of the side faces of the first chassis 101 and one of the side faces of the second chassis 102 are coupled (connected) via the hinge mechanism 103 so that the first chassis 101 and second chassis 102 are relatively rotatable around the rotary shaft of the hinge mechanism 103. The opening angle (hinge angle) with the rotation of the first chassis 101 and second chassis 102 is indicated as "θ".

When the opening angle θ of the first chassis 101 and second chassis 102 around the rotary shaft is approximately 0°, the first chassis 101 and second chassis 102 overlap to be closed (referred to as "closed state"). The surfaces of the first and second chassis 101 and 102 facing each other in the closed state are referred to as their respective "inner surfaces" and the surfaces opposite to the inner surfaces are referred to as their "outer surfaces". The opening angle θ can also be referred to as the angle between the inner surface of the first chassis 101 and the inner surface of the second chassis 102. When the first chassis 101 and second chassis 102 are open from the closed state, this is referred to as "open state". In the open state, the first chassis 101 and second chassis 102 are relatively rotated until the opening angle θ is greater than a preset threshold (e.g., 10°). Typically, as illustrated in the drawing, the apparatus is often used with an opening angle of about θ=100° to 130°.

The inner surface of the first chassis 101 comes with a display unit 14. The display unit 14 displays images based on the processing performed by the information processing apparatus 10. The inner surface of the first chassis 101 also has a microphone 40 in an area of the periphery of the display unit 14. The microphone 40 may be a stereo microphone including two microphones on the right and left.

The inner surface of the second chassis 102 comes with a keyboard 32 and a speaker 50. The keyboard 32 is an input device that accepts user operations. The speaker 50 is a stereo speaker that includes two speakers of a speaker 51 on the left and a speaker 52 on the right. In the closed state, the display 14 is not visible, and the keyboard 32 cannot be operated. In the open state illustrated in FIG. 1, the display unit 14 is visible and the keyboard 32 is operable (i.e., the information processing apparatus 10 can be used).

Note here that the information processing apparatus 10 is designed to be connectable to two types of speakers 50. For instance, two types of speakers 50 are from different suppliers. These speakers 50 have some parameters with different characteristics from each other. To get the performance of the speaker no matter which of the two suppliers' speakers 50 is connected, parameter information for each supplier's speaker 50 is required. Thus, the information processing apparatus 10 is configured to have a different connection specification for each of the two types of speakers 50, thus identifying the type of the speaker 50 connected for control based on suitable parameters.

Figure 2A:
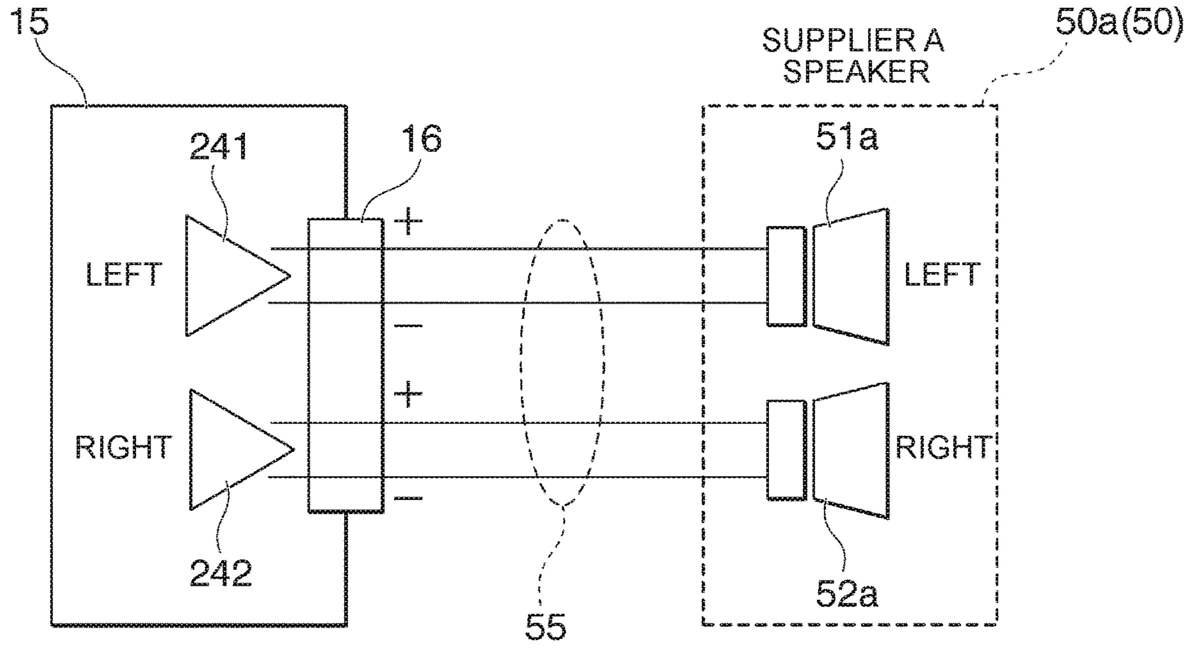
FIGS. 2A and 2B schematically illustrate an example of the connection specifications for speakers according to one embodiment.
Figure 2B:
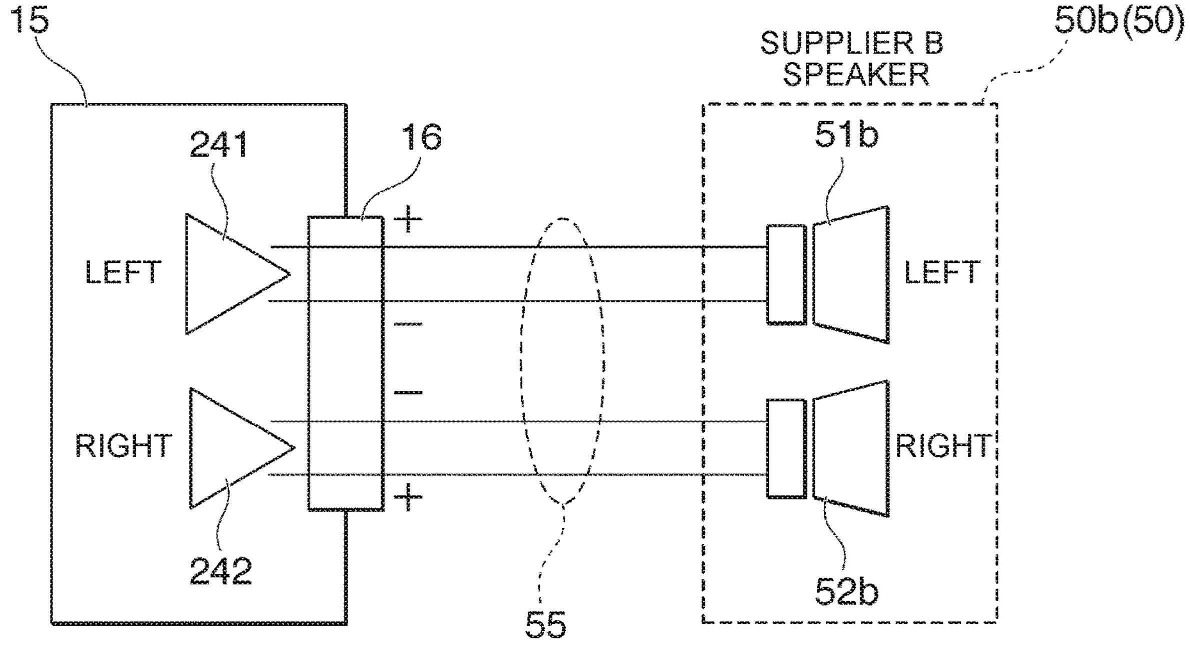

FIGS. 2A and 2B schematically illustrate an example of the connection specifications for speakers according to the present embodiment. The following describes an example of the configuration for the connection with the speakers 50 from two suppliers, supplier A and supplier B. Supplier A's speaker 50 is indicated as speaker 50*a*, and supplier B's speaker 50 is indicated as speaker 50*b*.

In FIG. 2A illustrates the connection specifications of the speaker 50*a* of supplier A. The speaker 50*a* has two speakers as a pair, speaker 51*a* on the left and speaker 52*a* on the right. Each of the speakers 51*a* and 52*a* is connected to a connector 16 mounted on a motherboard 15 via a speaker cable 55. Two audio amplifiers 241 and 242 as a pair are also mounted on the motherboard 15. The connector 16 has a terminal for connecting the audio amplifiers 241, 242 mounted on the motherboard 15 with the speaker 50*a*.

The left audio amplifier 241 is connected to the left speaker 51*a* via the connector 16. The right audio amplifier 242 is connected to the right speaker 52*a* via the connector 16. For instance, the connector 16 illustrated has four terminals, which are connected in order from the top terminal to the bottom terminal: to the speaker 51*a* positive (+), the speaker 51*a* negative (−), the speaker 52*a* positive (+), and the speaker 52*a* negative (−).

In FIG. 2B illustrates the connection specifications of the speaker 50*b* of supplier B. The speaker 50*b* has two speakers as a pair, speaker 51*b* on the left and speaker 52*b* on the right. Each of the speakers 51*b* and 52*b* is connected to a connector 16 via a speaker cable 55. The left audio amplifier 241 is connected to the left speaker 51*b* via the connector 16. The right audio amplifier 242 is connected to the right speaker 52*b* via the connector 16. The connector 16 has terminals, which are connected in order from the top terminal to the bottom terminal: to the speaker 51*b* positive (+), the speaker 51*b* negative (−), the speaker 52*b* negative (−), and the speaker 52*b* positive (+).

Thus, only the speaker 52*b* of supplier B is connected reversely in positive (+) and negative (−) to the connector 16. In other words, the speaker 51*a* and speaker 52*a* of supplier A are connected to the audio amplifier 241 and audio amplifier 242 via the connector 16 so that they are in phase with each other. The speaker 51*b* and speaker 52*b* of supplier B are connected to the audio amplifier 241 and audio amplifier 242 via the connector 16 so that they are in reverse phase (this also may be referred to as negative phase) with each other.

As illustrated in FIGS. 2A and 2B, the information processing apparatus 10 is configured to have a different connection specification between the speaker 50*a* of supplier A and the speaker 50*b* of supplier B, thus identifying the type of the speaker connected to the connector 16.

Figure 3A:
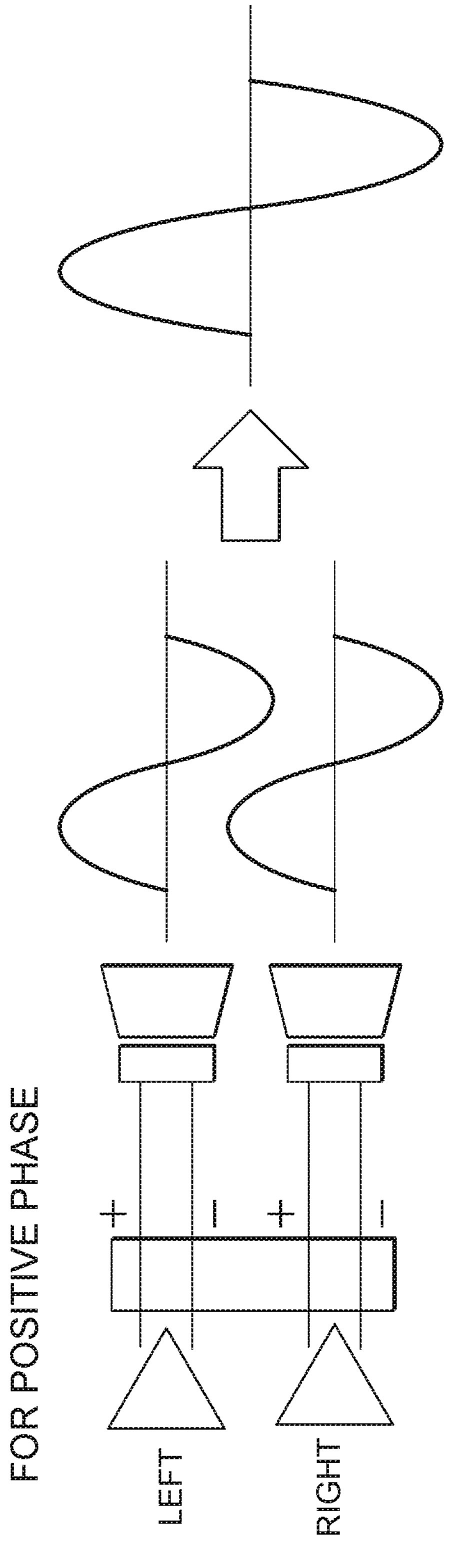
FIGS. 3A and 3B illustrate how to identify the speaker according to one embodiment.
Figure 3B:
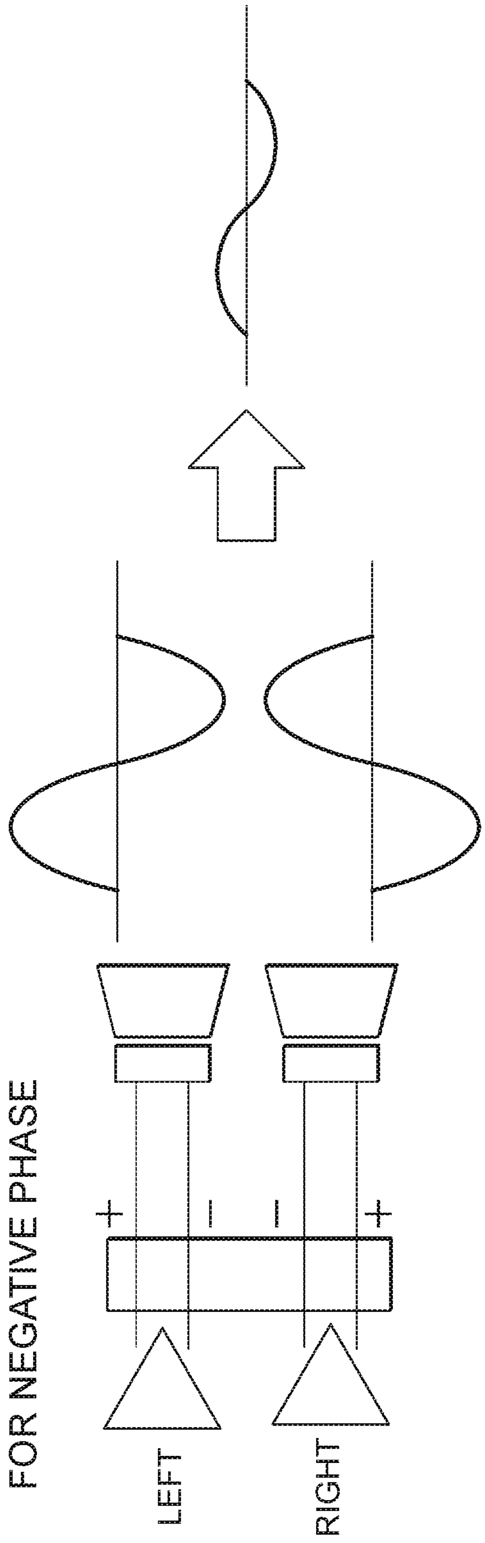

FIGS. 3A and 3B illustrate how to identify the speaker according to the present embodiment. In FIG. 3A, the two speakers are connected so that they are both in positive phase (i.e., in phase with each other). When a sine-wave sound signal is output from the two speakers, for example, the waveforms of the output sound waves in positive phase overlap, increasing the amplitude and the sound pressure.

In FIG. 3B, the two speakers are connected so that they are in reverse phase with each other. Similarly, when a sine-wave sound signal is output from the two speakers, the waveforms of the sound waves output from the two speakers cancel each other out, decreasing the amplitude and the sound pressure. Thus, the information processing apparatus 10 enables the identification of the speaker 50*a* of supplier A from the speaker 50*b* of supplier B, based on whether the sound pressure increases or decreases.

Hardware Configuration of Information Processing Apparatus 10

Figure 4:
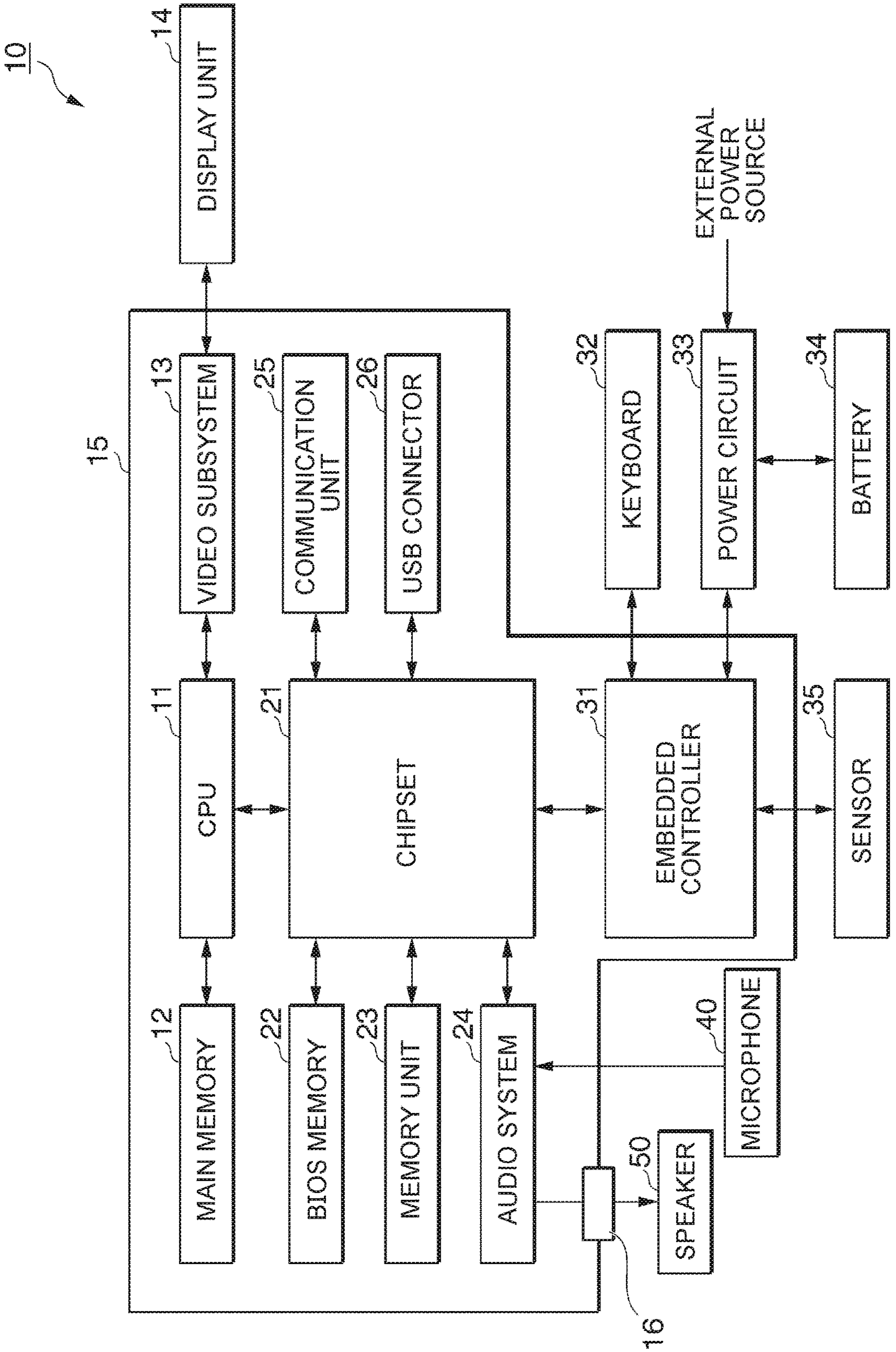
FIG. 4 is a block diagram illustrating one example of the hardware configuration of the information processing apparatus according to one embodiment.

Referring next to FIG. 4, the following describes the major hardware configuration of the information processing apparatus 10. FIG. 4 is a block diagram illustrating one example of the hardware configuration of the information processing apparatus 10 according to the present embodiment.

The information processing apparatus 10 includes a CPU 11, a main memory 12, a video subsystem 13, a display unit 14, a chipset 21, a BIOS memory 22, a memory unit 23, an audio system 24, a communication unit 25, a USB connector 26, an embedded controller 31, a keyboard 32, a power circuit 33, and a battery 34.

For instance, the CPU 11, the main memory 12, the video subsystem 13, the chipset 21, the BIOS memory 22, the memory unit 23, the audio system 24 and the communication unit 25, the USB connector 26, the embedded controller 31, and a sensor 35 are mounted on the motherboard 15 (main circuit board).

The CPU 11 executes different types of arithmetic processing under the control of a program to control the information processing apparatus 10 as a whole. For instance, the CPU 11 executes processing based on the operating system (OS) and basic input output system (BIOS) programs. The CPU 11 also executes processing based on various drivers, various services/utilities, applications, and others executed on the OS.

The main memory 12 is a writable memory used as a read area for programs executed by CPU 11 or as a work area for writing data used in processes executed by the programs. For instance, the main memory 12 includes a plurality of dynamic random access memory (DRAM) chips. The program executed includes an OS, various types of drivers to operate peripherals as hardware, various types of service/utility and application programs.

The video subsystem 13 is to implement the functions related to image displaying, and includes a video controller. This video controller processes a drawing instruction from the CPU 11 and writes the processed drawing information on a video memory. The video controller also reads this drawing information from the video memory and outputs the drawing information as drawing data (display data) to the display unit 14.

For instance, the display unit 14 is a liquid crystal display or an organic EL display, and displays an image based on the drawing data (display data) output from the video subsystem 13.

The chipset 21 includes a controller, such as universal serial bus (USB), serial AT attachment (ATA), serial peripheral interface (SPI) bus, peripheral component interconnect (PCI) bus, PCI-Express bus, or low pin count (LPC) bus, and a plurality of devices are connected to the chipset 21. For instance, the plurality of devices include the BIOS memory 22, the memory unit 23, the audio system 24, the communication unit 25, the USB connector 26, and the embedded controller 31, which will be described later.

The BIOS memory 22 includes a non-volatile memory that is electrically rewritable, such as an electrically erasable programmable read only memory (EEPROM) or a flash ROM. The BIOS memory 22 stores BIOS and system firmware to control the embedded controller 31 and others.

The memory unit 23 includes a hard disk drive (HDD), a solid state drive (SSD) and others. For instance, the memory unit 23 stores an OS, various drivers, various services/utilities, application programs, and various data.

The audio system 24 includes the audio amplifiers 241 and 242, described referring to FIGS. 1 and 2A-2B, and is connected to the speakers 50 via the connector 16. For instance, the audio system 24 generates a sound signal based on sound data and outputs it to the speaker 50. The audio system 24 is connected to the microphone 40, and generates sound data based on a sound signal collected with the microphone 40. The details are described below with reference to FIG. 5.

The communication unit 25 connects to a network via wireless local area network (LAN) or wired LAN for data communication. For instance, when receiving data from the network, the communication unit 25 generates an event trigger indicating the data reception. The communication unit 25 may also communicate with peripherals through short-range wireless communication such as Bluetooth (registered trademark).

The USB connector 26 is to connect peripherals using USB.

The keyboard 32 is an input device having an array of a plurality of keys (one example of an operator) that accepts user operations. As illustrated in FIG. 1, the keyboard 32 is placed on the inner surface of the second chassis 102. The keyboard 32 outputs input information (e.g., operation signals indicating keys operated with the keyboard) input through a user operation to the embedded controller 31.

For instance, the power circuit 33 includes a DC/DC converter, a charge-discharge unit, and an AC/DC adaptor. For instance, the power circuit 33 converts DC voltage supplied from an external power source such as an AC adapter (not illustrated) or the battery 34 into the multiple levels of voltage required to operate the information processing apparatus 10. The power circuit 33 supplies electricity to different parts of the information processing apparatus 10 under the control of the embedded controller 31.

For instance, the battery 34 is a lithium battery. When power is supplied to the information processing apparatus 10 from an external power source, the battery 34 is charged via the power circuit 33. When power is not supplied to the information processing apparatus 10 from an external power source, the battery 34 outputs the charged power for the operating power of the information processing apparatus 10 via the power circuit 33.

The sensor 35 includes various sensors, including a Hall sensor, an acceleration sensor, or a temperature sensor. Each of these sensors is placed at a location corresponding to the detection target, and outputs a detection signal. For example, a Hall sensor is used to detect whether the information processing apparatus 10 is in the open state or the closed state. The acceleration sensor is used to detect the orientation and movement of the information processing apparatus 10, or the opening angle θ between the first chassis 101 and second chassis 102. The temperature sensor is used to detect the internal temperature of the information processing apparatus 10.

The embedded controller 31 is a one-chip microcomputer to monitor and control various devices (e.g., peripherals and sensors), irrespective of the system state of the information processing apparatus 10. The embedded controller 31 includes a CPU, a ROM, a RAM, and an A/D input terminal, a D/A output terminal, a timer, and a digital input/output terminal for a plurality of channels, which are not illustrated. To the digital input/output terminal of the embedded control 31, the keyboard 32, the power circuit 33, and the sensor 35 and others are connected. The embedded controller 31 receives input information (operation signal) from the keyboard 32 and a sensor signal from the sensor 35 and others. The embedded controller 31 controls the operation of the power circuit 33 and others.

Functional Configuration of Information Processing Apparatus 10

Next, the following describes the functional configuration of the information processing apparatus 10 that identifies the type of the speaker 50 connected for control.

Figure 5:
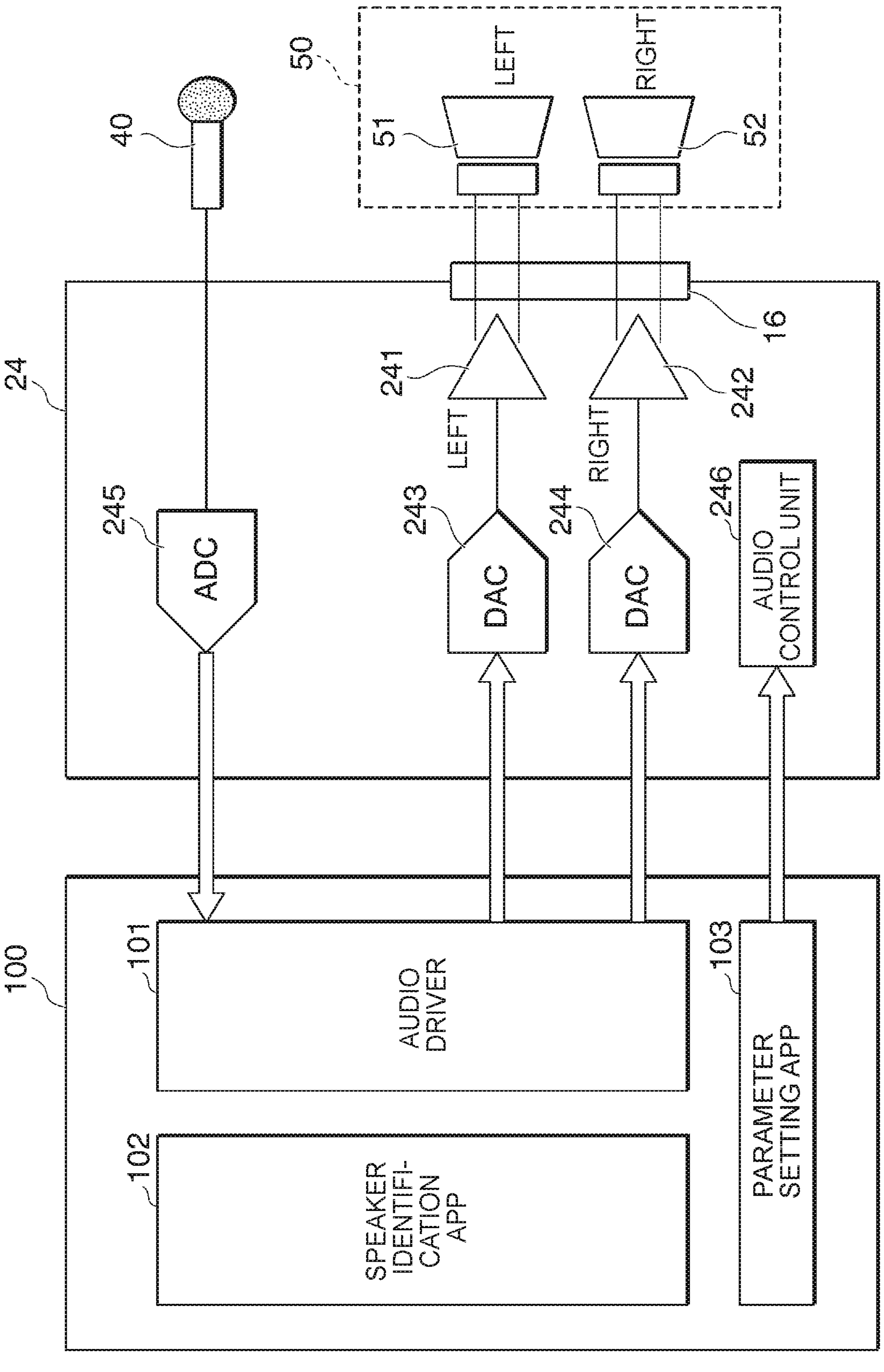
FIG. 5 is a block diagram illustrating an example of the functional configuration of an information processing apparatus according to one embodiment.

FIG. 5 is a block diagram illustrating one example of the functional configuration of the information processing apparatus 10 according to the present embodiment. The information processing apparatus 10 includes a processing unit 100 as a functional configuration that is implemented by the CPU 11 executing various programs. The processing unit 100 has an audio driver 101, a speaker identification application 102, and a parameter setting application 103.

The audio driver 101 is a functional configuration implemented through processing by the audio driver, and controls the audio system 24 to cause the speaker 50 to output sound. For instance, the audio driver 101 outputs sound data of the sound, which is to be output from the speaker 50, to the audio system 24.

The speaker identification application 102 performs identification process to identify the type of the speaker 50 connected. Note that this identification process is executed through a predetermined operation by an operator before shipment from the factory or when a component of the speaker 50 is replaced in a repair service after shipment, for example.

In this identification process, the speaker identification application 102 causes the speaker 50 to output sound based on predetermined sound data (e.g., sine-wave sound data). Specifically, the speaker identification application 102 outputs the predetermined sound data (e.g., sine-wave sound data) to the audio system 24 via the audio driver 101, thereby causing the speaker 50 to output the sound based on the predetermined sound data (e.g., sine-wave sound data) via the audio system 24.

The speaker identification application 102 then collects the sound output from the speaker 50 with the microphone 40 and identifies the type of speaker 50 connected to the connector 16 based on the collected sound. Specifically, the speaker identification application 102 acquires the microphone signal of the sound collected with the microphone 40 via the audio system 24 and the audio driver 101, and identifies the type of the speaker 50 based on the sound pressure of the sound of the acquired microphone signal, as described referring to FIGS. 3A and 3B.

Figure 6:
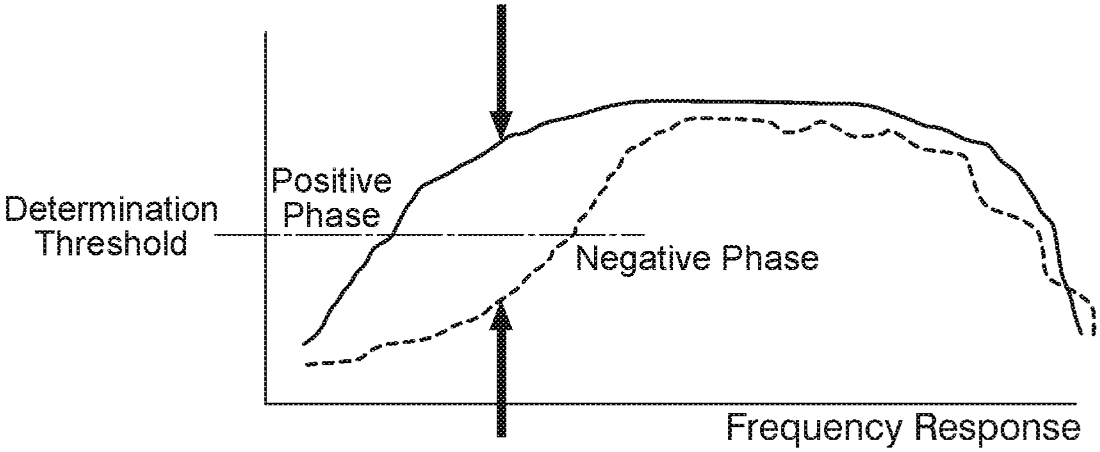
FIG. 6 illustrates an example of the frequency characteristics of the sound pressure in the positive and negative phases according to one embodiment.

FIG. 6 illustrates an example of the frequency characteristics of the sound pressure in the positive and negative phases according to the present embodiment. When changing the frequency, the sound pressure in negative phase decreases significantly in a low frequency range compared to the positive phase. Thus, the speaker identification application 102 causes a sound based on sine-wave sound data in the low frequency range (e.g., 500 Hz) to be output from the speaker 50 in the identification process. If the sound pressure of the sound output from the speaker 50 is higher than a preset threshold for determination, the speaker identification application 102 determines that it is the speaker 50*a* of supplier A. When the sound pressure is lower than the threshold, the speaker identification application 102 determines that it is the speaker 50*b* of supplier B.

Referring back to FIG. 5, when it is determined that the speaker 50*a* of supplier A is connected to the connector 16, the speaker identification application 102 controls the audio system 24 so that the sound signals output from the audio amplifier 241 and the audio amplifier 242 are in phase with each other. When it is determined that the speaker 50*b* of supplier B is connected to the connector 16, the speaker identification application 102 controls the audio system 24 so that the sound signals output from the audio amplifier 241 and the audio amplifier 242 are in reverse phase with each other.

For instance, when it is determined that the speaker 50*a* of supplier A is connected to the connector 16, the speaker identification application 102 transmits a positive-phase setting signal to the audio system 24 so as to set both of the sound signals output from the audio amplifier 241 and the audio amplifier 242 in positive phase. When it is determined that the speaker 50*b* of supplier B is connected to the connector 16, the speaker identification application 102 transmits a positive-phase setting signal and a negative-phase setting signal to the audio system 24, where the positive-phase setting signal sets the sound signals output from the audio amplifier 241 in positive phase, and the negative-phase setting signal sets the sound signals output from the audio amplifier 242 in negative phase (sets so as to swap the polarity).

The parameter setting application 103 sets adjustment parameters at the audio system 24 according to the type of speaker 50 connected. The adjustment parameters are designed in advance based on Thiele-small (TS) parameters related to the characteristics of each type of the speaker 50. The parameter setting application 103 reads the adjustment parameters in accordance with the type of the speaker 50 connected, and outputs them to the audio system 24. The audio system 24 uses the adjustment parameters when generating a sound signal from the sound data, thus generating a sound signal in accordance with the characteristics of the speaker 50.

The polarity of the output of the audio amplifier 242 and the settings of the adjustment parameters are described in the registry, for example. In one example, the polarity of the connection of the speaker 50 is described under the registry key (¥HKEY_LOCAL_MACHINE¥SOFTWARE¥chipsuppliername¥SmartAmpCMD), and parameter values adapted to the speaker 50*a* of supplier A or speaker 50*b* of supplier B are described under the registry key (¥HKEY_LOCAL_MACHINE¥SOFTWARE¥chipsuppliername¥SpkProtection). For instance, the registry is stored in the memory unit 23 and is loaded into the main memory 12 during OS startup.

Instead of the registry, they may be described in the BIOS memory 22. For instance, when the unified extensible firmware interface (UEFI) is used as the BIOS, the polarity of the output of the audio amplifier 242 and the adjustment parameters may be described in an area where the user is allowed to describe (GenericArea).

The audio system 24 includes the audio amplifier 241, the audio amplifier 242, a DAC 243, a DAC 244, an ADC 245, and an audio control unit 246. The audio amplifier 241 is connected to the left speaker 51 via the connector 16, and amplifies the input sound signal and outputs it to the speaker 51. The audio amplifier 242 is connected to the right speaker 52 via the connector 16, and amplifies the input sound signal and outputs it to the speaker 52.

The DAC 243 and DAC 244 are digital to analog converters that convert sound data (digital signal) to sound signal (analog signal). The DAC 243 acquires sound data to be output from the left speaker 51 from the audio driver 101, converts the acquired sound data into a sound signal, and outputs it to the audio amplifier 241. The DAC 244 acquires sound data to be output from the right speaker 52 from the audio driver 101, converts the acquired sound data into a sound signal, and outputs it to the audio amplifier 242.

The ADC 245 is an analog to digital converter that converts a microphone signal (analog signal) to sound data (digital signal). The ADC 245 acquires the microphone signal of the sound collected with the microphone 40, converts the acquired microphone signal to sound data, and outputs it to the audio driver 101.

The audio control unit 246 sets the outputs of the audio amplifier 241 and audio amplifier 242 to the positive or negative phase based on the positive-phase or negative-phase setting signal transmitted from the speaker identification application 102. For instance, when the audio control unit 246 acquires a negative-phase setting signal that sets the sound signal output from the audio amplifier 242 to be the negative phase (set to swap the polarity), the audio control unit 246 swaps the positive and negative polarity of the sound signal output from the audio amplifier 242.

The audio control unit 246 also adjusts the sound signal to be converted from the sound data using the adjustment parameters in accordance with the type of the speaker 50 and loaded by the parameter setting application 103. Specifically, the audio control unit 246 uses the adjustment parameters for the speaker 50*a* of supplier A when generating a sound signal to be output to the speaker 50*a* of supplier A from the sound data. The audio control unit 246 uses the adjustment parameters for the speaker 50*b* of supplier B when generating a sound signal to be output to the speaker 50*b* of supplier B from the sound data.

Speaker Identification Process

Figure 7:
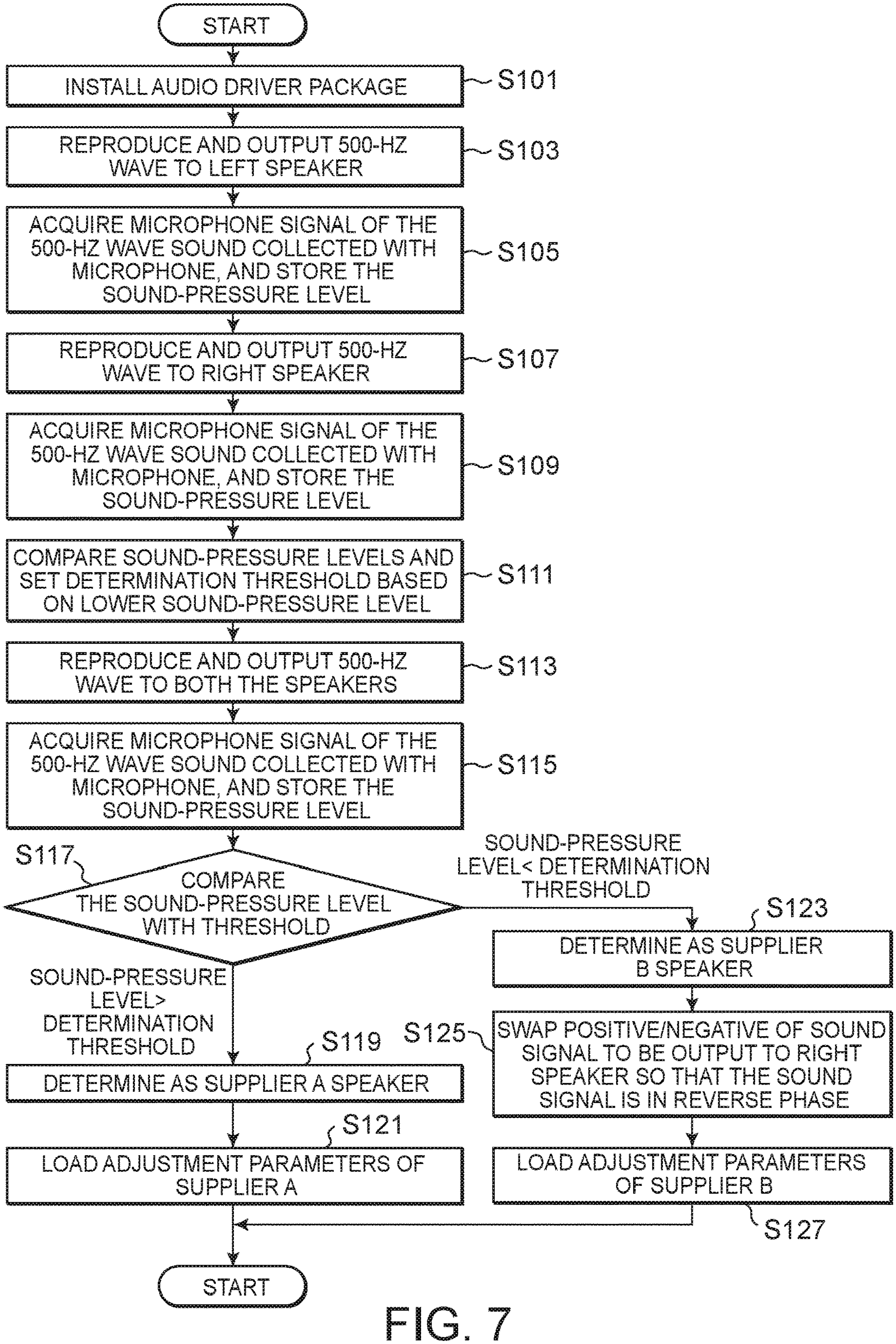
FIG. 7 is a flowchart showing one example of the speaker identification process according to one embodiment.

Referring next to FIG. 7, the following describes the operation of speaker identification process that the processing unit 100 of the information processing apparatus 10 executes.

FIG. 7 is a flowchart showing one example of the speaker identification process according to the present embodiment. The speaker identification process in this chart is executed by a predetermined operation of an operator, for example, in a step before shipment from the factory or when a component of the speaker 50 is replaced after shipment for repair service, for example.

(Step S101) First, an audio driver package is installed on the information processing apparatus 10. The audio driver package is a program to implement the functions of the audio driver 101, parameter setting application 103, and speaker identification application 102 that the processing unit 100 illustrated in FIG. 5 includes. The program for implementing the functions of the audio driver 101, parameter setting application 103, and speaker identification application 102 may be provided as a separate program for each function, or as a single program that combines the functions.

(Step S103) The processing unit 100 reproduces and outputs 500 Hz sine-wave sound data to the left speaker 51. Specifically, the processing unit 100 reproduces 500 Hz sine-wave sound data to be output to the left speaker 51, and outputs it to the audio system 24. This outputs a sound signal based on the 500 Hz sine-wave sound data to the audio system 24 for the speaker 51, and the speaker 51 outputs a 500 Hz sine-wave sound.

(Step S105) The processing unit 100 acquires a microphone signal of the 500 Hz sine-wave sound (sound output from the left speaker 51) collected with the microphone 40, and stores the sound-pressure level of the acquired microphone signal.

(Step S107) The processing unit 100 reproduces and outputs 500 Hz sine-wave sound data to the right speaker 52. Specifically, the processing unit 100 reproduces 500 Hz sine-wave sound data to be output to the right speaker 52, and outputs it to the audio system 24. This outputs a sound signal based on the 500 Hz sine-wave sound data to the audio system 24 for the speaker 52, and the speaker 52 outputs a 500 Hz sine-wave sound.

(Step S109) The processing unit 100 acquires a microphone signal of the 500 Hz sine-wave sound (sound output from the right speaker 52) collected with the microphone 40, and stores the sound-pressure level of the acquired microphone signal.

(Step S111) The processing unit 100 compares the sound-pressure level stored in step S105 and the sound-pressure level stored in step S109, and sets a determination threshold based on the lower sound-pressure level.

(Step S113) The processing unit 100 reproduces and outputs 500 Hz sine-wave sound data to both the speaker 51 and the speaker 52. Specifically, the processing unit 100 reproduces 500 Hz sine-wave sound data to be output to the speaker 51 and speaker 52, and outputs it to the audio system 24. This outputs a sound signal based on the 500 Hz sine-wave sound data to the audio system 24 for the speaker 51 and speaker 52, and both the speaker 51 and the speaker 52 output a 500 Hz sine-wave sound.

(Step S115) The processing unit 100 acquires a microphone signal of the 500 Hz sine-wave sound (sound output from both the speaker 51 and speaker 52) collected with the microphone 40, and stores the sound-pressure level of the acquired microphone signals.

(Step S117) The processing unit 100 compares the sound-pressure level stored in step S115 to the determination threshold set in step S111, thus determining their magnitude relationship. If the processing unit 100 determines that the sound-pressure level is greater than the determination threshold, it determines that the speaker 50*a* of supplier A is connected (step S119). Then, the procedure shifts to step S121. If the processing unit 100 determines that the sound-pressure level is smaller than the determination threshold, it determines that the speaker 50*b* of supplier B is connected (step S123). Then the procedure shifts to step S125.

(Step S121) If the processing unit 100 determines that the speaker 50*a* of supplier A is connected, it loads the adjustment parameters of the speaker 50*a* of supplier A and sets them in the audio system 24.

(Step S125) If the processing unit 100 determines that the speaker 50*b* of supplier B is connected, it swaps the positive/negative polarity of sound signal to be output to the right speaker 51 so that the sound signal is in reverse phase. Then the procedure shifts to step S127.

(Step S127) The processing unit 100 loads the adjustment parameters of the speaker 50*b* of supplier B and sets them to the audio system 24.

Summary of Embodiment

As described above, the information processing apparatus 10 according to the present embodiment is connected to one of two types of connectable speakers 50 (an example of a stereo speaker). The information processing apparatus 10 includes: a memory (e.g., main memory 12) that stores sound data for sound to be output from the speaker 50; two audio amplifiers 241 and 242 (an example of an amplifier) that output sound signals based on sound data to the two speakers 51 and 52, respectively, that the speaker 50 has; a connector 16 (an example of a connector) that connects the two audio amplifiers 241 and 242 to the two speakers 51 and 52; a microphone 40 capable of collecting at least the sound output from the speaker 50; and a CPU 11 (an example of a processor) that controls the output to the speaker 50. When the speaker 50*a* of supplier A (an example of a first stereo speaker) of the two types of speakers 50 is to be connected to the connector 16, the speaker is connected to the audio amplifiers 241 and 242 via the connector 16 so that the two speakers 51*a* and 52*a* of the speaker 50*a* are in phase with each other. When the speaker 50*b* of supplier B (an example of a second stereo speaker) of the two types of speakers 50 is to be connected to the connector 16, the speaker is connected to the audio amplifiers 241 and 242 via the connector 16 so that the two speakers 51*b* and 52*b* of the speaker 50*b* are in reverse phase with each other. The CPU 11 outputs a sound signal based on predetermined sound data (e.g., 500 Hz sine-wave sound data) from the audio amplifiers 241 and 242 to the speaker 50 connected to the connector 16, thus collecting the sound output from the speaker 50 with the microphone 40 and performing identification process of identifying the type of speaker 50 connected to the connector 16 based on the collected sound.

This allows the information processing apparatus 10 to identify the type of speaker 50 connected to the connector 16 without providing a terminal for identification on the connector 16, and thus to support the connection with two types of stereo speakers while reducing the impact on cost and space on the circuit board.

For instance, the CPU 11 identifies the type of speaker 50 based on the sound pressure of the sound collected with microphone 40 in the above identification process.

This allows the information processing apparatus 10 to identify the type of speaker 50 connected based on the sound-pressure level, and thus to support the connection with two types of stereo speakers while reducing the impact on cost and space on the circuit board.

Based on the type of the speaker 50 identified by the above identification process, when the speaker 50*a* of supplier A is connected to the connector 16, the CPU 11 controls the sound signals output from the two audio amplifiers 241 and 242 to be in phase with each other. When the speaker 50*b* of supplier B is connected to the connector 16, the CPU 11 controls the sound signals output from the two audio amplifiers 241 and 242 to be in reverse phase with each other.

This allows the information processing apparatus 10 to have a different connection specification for each of the two types of speakers 50, thus identifying the type of the speaker 50 connected. This allows also, after identification, the information processing apparatus 10 to appropriately control the sound signal output to the speaker 50 to be in phase or in reverse phase according to the connection specification. Thus, this allows the information processing apparatus 10 to support the connection with two types of stereo speakers while reducing the impact on cost and space on the circuit board.

The memory (e.g., main memory 12 or BIOS memory 22) stores adjustment parameters (an example of parameters) for the characteristics of each of the two types of speakers 50. The information processing apparatus 10 further includes the audio system 24 (an example of an audio processing unit) that uses these parameters when generating sound signals to be output to the speaker 50 from sound data. Based on the type of speaker 50 identified by the identification process described above, the CPU 11 reads adjustment parameters for the speaker 50 connected to the connector 16 from the memory so that they can be used by the audio system 24.

This allows the information processing apparatus 10 to identify the type of speaker 50 connected to the connector 16 and get its performance without having to provide a terminal for identification on the connector 16. This therefore allows the information processing apparatus 10 to support the connection with two types of stereo speakers while reducing the impact on cost and space on the circuit board.

For instance, a sound signal based on predetermined sound data is a sine-wave signal (e.g., a 500 Hz sine-wave signal).

This allows the information processing apparatus 10 to identify the type of the speaker 50 connected based on a difference in sound-pressure level.

The CPU 11 performs the identification process to identify the type of the speaker 50 at a step before shipment from the factory or when a component of the stereo speaker is replaced after the shipment.

This allows the information processing apparatus 10 to support connection with two types of stereo speakers at the time of shipment of a product, and also to support a connection with two types of stereo speakers for repairs and other support.

A control method for the information processing apparatus 10 that is connected to one of two types of connectable speakers 50 (an example of a stereo speaker) according to the present embodiment, includes: when the speaker 50*a* of supplier A (an example of a first stereo speaker) of the two types of speakers 50 is to be connected to the connector 16, connecting the speaker to the audio amplifiers 241 and 242 via the connector 16 so that the two speakers 51*a* and 52*a* of the speaker 50*a* are in phase with each other, when the speaker 50*b* of supplier B (an example of a second stereo speaker) of the two types of speakers 50 is to be connected to the connector 16, connecting the speaker to the audio amplifiers 241 and 242 via the connector 16 so that the two speakers 51*b* and 52*b* of the speaker 50*b* are in reverse phase with each other, and the CPU 11 performs: outputting a sound signal based on predetermined sound data (e.g., 500 Hz sine-wave sound data) from the audio amplifiers 241 and 242 to the speaker 50 connected to the connector 16; collecting sound output from the speaker 50 with the microphone 40; and identifying the type of the speaker 50 connected to the connector 16 based on the sound collected with the microphone 40.

This allows the information processing apparatus 10 to identify the type of speaker 50 connected to the connector 16 without providing a terminal for identification on the connector 16, and thus to support the connection with two types of stereo speakers while reducing the impact on cost and space on the circuit board.

That is the detailed descriptions of the embodiment of the present invention, with reference to the drawings. The specific configuration of the present invention is not limited to the above-described embodiment, and also includes design modifications or the like within the scope of the present invention. For instance, the configurations described in the above embodiments can be combined freely.

The above embodiment describes an example of using a 500 Hz sine-wave signal to identify the type of the speaker 50, and the frequency of the sine wave is not limited to 500 Hz, and a sine-wave signal other than 500 Hz in the low frequency range may be used. Sound signals other than sine-wave signals may also be used.

The above embodiment describes an example of an application related to the speaker identification process that is packaged with an audio driver for provision. The application may be provided separately from the audio driver (e.g., in the form of a speaker driver). The application may be provided to a user as a package with the audio driver or speaker driver, whereby the speaker identification process may be executed automatically when the user installs the audio driver or speaker driver. This allows, even when the user reinstalls the OS while using the information processing apparatus 10, the information processing apparatus 10 to identify the type of the speaker 50 through the speaker identification process and control it appropriately.

The above-stated information processing apparatus 10 internally includes a computer system. A program to implement the functions of various configurations of the information processing apparatus 10 as stated above may be stored in a computer-readable recording medium, and the processing at the various configurations of the information processing apparatus 10 may be performed by causing the computer system to read and execute the program stored in this recording medium. "Causing the computer system to read and execute the program stored in the recording medium" includes installing of such a program in the computer system. The "computer system" here includes an OS and hardware, such as peripherals. The "computer system" may include a plurality of computer devices connected via a network, including the internet and communication lines such as WAN, LAN and dedicated lines. The "computer readable recording medium" is a portable medium, such as flexible disk, a magneto-optical disc, a ROM, or a CD-ROM, as well as a memory internally stored in the computer system, such as hard disk. In this way, the recording medium to store the program may be a non-transient recording medium, such as a CD-ROM.

The recording medium also includes an internal or external recording medium where a distribution server can access to distribute the program. The program may be divided into a plurality of pieces. After these pieces of program may be downloaded at different timings, they may be combined by the configurations of the information processing apparatus 10. Alternatively, different distribution servers may distribute these divided pieces of program. The "computer readable recording medium" also includes the one that can hold a program for a certain period of time, as in a server that receives a program transmitted via a network or a volatile memory (RAM) in the computer system as the client. The program may implement a part of the functions as stated above. The program may be a differential file (differential program) that can implement the above functions by combining it with a program which is already stored in the computer system.

A part or all of the functions that the information processing apparatus 10 of the above-described embodiment has may be implemented as an integrated circuit, such as a LSI (Large Scale Integration). Each of the functions as stated above may be implemented as one processor, or a part or all of the functions may be implemented as one processor in an integrated manner. A technique for integrated circuit is not limited to a LSI, and an integrated circuit may be realized using a dedicated circuit or a general-purpose processor. If a technique for integrated circuit that replaces LSIs becomes available with the development of semiconductor techniques, an integrated circuit based on such a technique may be used.

The above embodiment describes the information processing apparatus 10 that is a laptop PC, which may be a desktop or tablet PC, a smartphone, a game console, or an electronic device dedicated to videoconferencing. The display unit 14 is not limited to that built into the information processing apparatus 10, which may be a peripheral device connected via HDMI (registered trademark) or USB.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS

10 information processing apparatus
101 first chassis
102 second chassis
103 hinge mechanism
11 CPU
12 main memory
13 video subsystem
14 display unit
21 chipset
22 BIOS memory
23 memory unit
24 audio system
25 communication unit
26 USB connector
31 embedded controller
32 keyboard
33 power circuit
34 battery
35 sensor
110 processing unit
101 audio driver
102 speaker identification app
103 parameter setting app
241 audio amplifier

242 audio amplifier
243 DAC
244 DAC
245 ADC
246 audio control unit

What is claimed is:

1. An information processing apparatus to be connected to one of two types of connectable stereo speakers, comprising:

a memory that stores sound data for sound to be output from the stereo speakers;

two amplifiers that output sound signals based on the sound data to two speakers, respectively, that each stereo speaker has;

a connector that connects the two audio amplifiers to the two speakers;

a microphone capable of collecting at least the sound output from the stereo speakers; and a processor that controls output to the stereo speakers, when a first stereo speaker of the two types of stereo speakers is to be connected to the connector, the first stereo speaker being connected to the amplifiers via the connector so that the two speakers of the first stereo speaker are in phase with each other, when a second stereo speaker of the two types of stereo speakers is to be connected to the connector, the second stereo speaker being connected to the amplifiers via the connector so that the two speakers of the second stereo speaker are in reverse phase with each other, the processor being configured to output a sound signal based on predetermined sound data from the amplifiers to the stereo speaker connected to the connector, thus collecting sound output from the stereo speaker with the microphone, and performing identification process of identifying the type of the stereo speaker connected to the connector based on the collected sound.

2. The information processing apparatus according to claim 1, wherein the processor is configured to identify the type of the stereo speaker based on sound pressure of the sound collected with the microphone in the identification process.

3. The information processing apparatus according to claim 1, wherein the processor is configured to, based on the type of the stereo speaker identified in the identification process, when the first stereo speaker is connected to the connector, control so that sound signals output from the two amplifiers are in phase with each other, and when the second stereo speaker is connected to the connector, control so that sound signals output from the two amplifiers are in reverse phase with each other.

4. The information processing apparatus according to claim 1, wherein the memory stores a parameter in accordance with characteristics of each of the two types of stereo speakers, the information processing apparatus further comprises an audio processing unit that uses the parameter when generating a sound signal to be output to the stereo speakers from the sound data, and the processor is configured to based on the type of the stereo speaker identified in the identification process, read the parameter for the stereo speaker connected to the connector from the memory so that the parameter is usable at the audio processing unit.

5. The information processing apparatus according to claim 1, wherein a sound signal based on the predetermined sound data includes a sine-wave signal.

6. The information processing apparatus according to claim 1, wherein the processor is configured to perform the identification process at a step before shipment from a factory or when a component of the stereo speakers is replaced after the shipment.

7. A control method for an information processing apparatus that is connected to one of two types of connectable stereo speakers, the information processing apparatus including: a memory that stores sound data of sound to be output from the stereo speakers; two amplifiers as a pair that output sound signals based on the sound data to two speakers as a pair, respectively, that each stereo speaker has; a connector that connects the two audio amplifiers as a pair to the two speakers as a pair; a microphone capable of collecting at least the sound output from the stereo speakers; and a processor that controls output to the stereo speakers, when a first stereo speaker of the two types of stereo speakers is to be connected to the connector, the first stereo speaker being connected to the amplifiers via the connector so that the two speakers as a pair of the first stereo speaker are in phase with each other, and when a second stereo speaker of the two types of stereo speakers is to be connected to the connector, the second stereo speaker being connected to the amplifiers via the connector so that the two speakers as a pair of the second stereo speaker are in reverse phase with each other, the processor performing:

outputting a sound signal based on predetermined sound data from the amplifiers to the stereo speaker connected to the connector;

collecting sound output from the stereo speaker with the microphone; and identifying the type of the stereo speaker connected to the connector based on the sound collected with the microphone.

* * * * *